United States Patent Office 2,822,255
Patented Feb. 4, 1958

2,822,255

MANUFACTURE OF ABRASIVE ARTICLES

Cyril Aubrey Redfarn, London, England

No Drawing. Application July 18, 1955
Serial No. 522,838

Claims priority, application Great Britain July 19, 1954

13 Claims. (Cl. 51—298)

This invention is for improvements in or relating to the manufacture of abrasive articles and is of particular interest in connection with the manufacture of grinding wheels.

In the conventional production of grinding wheels abrasive grains consisting, for example, of diamond dust, carborundum, boron carbide, spinel, are bonded together with a phenol formaldehyde resin.

The phenolic resin may be in the form of a liquid resole of a "Novolak" reduced to 200 mesh and mixed with 8–10% of hexamethylenetetramine also reduced to 200 mesh.

When the liquid resole is used the abrasive grains are mixed with about 10% of their weight of resin and then given a heat treatment at about 90° C. in order to thicken the mixture.

A wheel is then pressed in a mould at room temperature at a pressure of 1 ton per square inch in a hydraulic press. After ejection the formed wheel is cured by open baking for about 5 hours at a temperature rising gently from 90° C. to 150° C.

When the dry powder resin is used, that is the "Novolak-hexa" powder of 200 mesh, the abrasive grains are just wetted with about 3–4% of their weight of furfural and then 10% of their weight of the 200 mesh resin powder is mixed in. The mix is then pressed to a wheel in a mould at room temperature at 1 ton per square inch in a hydraulic press. After ejection the formed wheel is cured by open baking by heating at 90° C. for 24 hours followed by heating for another 24 hours at a temperature rising gently to 175° C.

Drawbacks of grinding wheels of this nature are—(1) that owing to the frictional heat produced when the wheel is used, the phenolic resin bond is broken down and the abrasive particles loosened and lost; (2) that owing to the rigid nature of the resin bond, the resistance to breakdown by grinding, especially at elevated temperature, is poor.

Phenol-formaldehyde resins are known to decompose at temperatures of 175° C. and above and consequently abrasive articles, particularly grinding wheels, in use if they develop surface temperatures of 175° C. or more suffer from breakdown of the surface, leading either to glazing and consequent loss of abrasive power, or to the actual wearing away and loss of the abrasive surface.

In "Structural Chemistry of Inorganic Compounds," by W. Hückel, 1951, volume II, chapter IX, part 2, section 6, a summary is given of various investigations concerning the formation of polyphosphochloronitrides $(PNCl_2)_n$, hereinafter referred to, in accordance with the currently used terminology, as polyphosphonitrilic chlorides, by the reaction of ammonium chloride with phosphorus pentachloride. These polyphosphonitrilic chlorides are crystals, liquids or rubber-like products which are water-insoluble and do not decompose by pyrolysis up to 450° C. Polymers can be prepared by heating 5.3 g. dry ammonium chloride with 20.8 g. of phosphorus pentachloride in 100 ccs. of tetrachloroethane under reflux until no further hydrogen chloride is evolved (about 1½ hours). Unchanged ammonium chloride is filtered off and the solvent distilled off, leaving the polymeric material. Re-crystallisation from dichloroethane gives softish crystals of $(PNCl_2)_n$ where $n=3$ or 4. Heating the crystals in a vessel at 360° C. brings about steady polymerisation until, in about 30 minutes, a rubbery material is obtained passing through an oily stage.

This product is water-insoluble and fire-resistant. The structure of the polymers is given as:

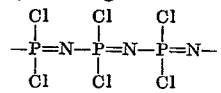

"Mixed polyphosphonitrilic chlorides" means a mixture of polyphosphonitrilic chlorides prepared according to the method of R. Schenck and G. Römer (Berichte, vol. 57, p. 1343 (1924)). The triphosphonitrilic chloride and tetraphosphonitrilic chloride were prepared by extracting the mixture of polyphosphonitrilic chlorides prepared in this way with light petrol boiling between 40° C. and 60° C. The extract, from which the solvent had been removed by evaporation, was filtered. The residue, consisting of crystalline triphosphonitrilic chloride and tetraphosphonitrilic chloride together with a little oil, was subjected to fractional distillation at a pressure of 13 mm. mercury. The triphosphonitrilic chloride was collected as a fraction boiling at 127° C., and the tetraphosphonitrilic chloride as a fraction boiling at 188° C.

I have found that the polyphosphonitrilic chlorides, being capable of further polymerisation, form a useful material as a bond for abrasive grains in the manufacture of abrasive articles and according to the invention, therefore, there is provided an abrasive article in which the bond is a polyphosphonitrilic chloride which has been further polymerised in situ. Due to the good thermal stability of the polymer, the disadvantages of decomposition at low temperatures of the order of 200° C. which are encountered with the normal phenol-formaldehyde-type resins are overcome. It is preferred to employ the lower molecular weight polyphosphonitrilic chlorides for example those where "$n$" in the general formula is from 3 to 7.

In addition to the simple low molecular weight polyphosphonitrilic chlorides, I have found that the modified polyphosphonitrilic chlorides, which are the subject of co-pending application Serial Number 521,408, filed July 11 1955, are also suitable as bonding media and, according to the present invention, there is employed as the bonding material in an abrasive article the modified polyphosphonitrilic chlorides described in said co-pending application.

The invention further includes the use of these modified polyphosphonitrilic chlorides which are obtained by reaction of a polyphosphonitrilic chloride, preferably of low molecular weight, with polyhydroxy aromatic compounds, such as resorcinol, hydroquinone and the partial esters with boric acid, with an inorganic phosphoric acid or a polyfunctional chlorine derivative thereof, or with phosphorus trichloride, of a polyhydroxy aromatic compound, which partial ester molecule contains free phenolic hydroxy groups and which may be formed in situ. The modified polyphosphonitrilic chlorides and the processes by which they are produced are fully disclosed in co-pending application Serial Number 521,408, filed July 11, 1955, and reference should be made to that application for fuller details of the production of the bonding agents employed in the practice of this invention.

The following examples illustrate the manner in which the invention may be carried into effect.

Example 1

In this example there is used as the binder an oily polyphosphonitrilic chloride and this material believed to have the formula $(PNCl_2)_5$, was mixed in a stout dough mixer of the type known as a Bridge Banbury mixer until a homogeneous mixture was prepared; during the mixing operation the polymer covered the solid particles of carborundum with a substantially uniform coating. The mixture was then placed in a positive mould and hot pressed under a pressure of 1 ton per square inch at a temperature of 360° C. for 1 hour.

Example 2

The binder was prepared from the following ingredients:

| | Grams |
|---|---|
| An oily polyphosphonitrilic chloride | 8 |
| Resin bonding agent | 38 |
| Hexamethylenetetramine | 2 |

The resin bonding agent was prepared by heating together 11 grams of hydroquinone, 11 grams of resorcinol and 18.6 grams of boric acid to a final temperature of 280° C., the resin being a dark red tough water-soluble material. The resin was ground to pass a sieve of 100 meshes per linear inch and the hexamethylenetetramine (ground to the same size) was intimately admixed with the resin.

The resin mixture was then mixed with a previously prepared mixture of the oily polyphosphonitrilic chloride with abrasive grains (which may be a carborundum of Example 1 or other abrasive materials as above-mentioned) and the mixture was then shaped by hot moulding at a temperature of 175° C.

Example 3

In this example there is employed a modified polyphosphonitrilic chloride formed by mixing an oily polyphosphonitrilic chloride with an equal weight of hydroquinone and heating the mixture at a temperature of 180–190° C. for a period of 50 minutes.

The end product was rubbery when hot but became a hard solid on cooling.

The modified polyphosphonitrilic chloride thus prepared was then intimately admixed with the appropriate amount of abrasive grains and with 10% of its weight of hexamethylenetetramine followed by curing under pressure in a mould.

Example 4

A binder was prepared from the following ingredients:

| | Grams |
|---|---|
| An oily polyphosphonitrilic chloride | 40 |
| Resin bonding agent | 38 |
| Hexamethylenetetramine | 2 |

The resin bonding agent is produced by mixing together 12.5 grams of phenol, 14.6 grams of hydroquinone, 22 grams of boric acid and 11 grams of water, the reaction mixture being heated under a reflux condenser arranged to permit escape of water but to prevent loss of the phenolic substances, the temperature of the mixture being gently raised to about 200° C. during the course of 1 hour. The resin thus produced was then mixed with the oily polyphosphonitrilic chloride and the hexamethylenetetramine and abrasive grains in the manner described in Example 2 and the mixture was shaped by hot moulding also as described in that example.

In this example the polyphosphonitrilic chloride is at least in part modified by reaction with the resin bonding agent.

Example 5

A binder was prepared from the following ingredients:

| | Grams |
|---|---|
| Oily polyphosphonitrilic chloride | 40 |
| Resin bonding agent | 38.5 |
| Hexamethylenetetramine | 1.5 |

In this example the resin bonding agent was prepared by heating together 12.5 grams of phenol, 7.3 grams of hydroquinone, 7.3 grams resorcinol, 22.9 grams of boric acid and 11 grams of water under a reflux condenser up to a temperature of 220° C. over a period of 6 to 7 hours.

The oily polyphosphonitrilic chloride having been previously mixed with the abrasive grains, the resin and hexamethylenetetramine were then added to the mix and the whole mixture was then shaped by hot moulding as described in Example 1.

Example 6

In this example there is employed a modified polyphosphonitrilic chloride which was prepared by heating together equal parts of the oily polymer and hydroquinone at a temperature of 180 to 190° C. for a period of 50 minutes. This modified polyphosphonitrilic chloride was then admixed in various proportions with silicon carbide grains of a size such as to pass a 100 mesh standard sieve but to be retained on a 150 mesh sieve.

The mixes were made up by taking varying proportions of the modified polyphosphonitrilic chloride to the silicon carbide grains, the variations being in the proportions of 1:2, 1:2½, 1:3, 1:3½ and 1:4 of the polymer to the abrasive grains by weight.

The modified polyphosphonitrilic chloride was ground to fine particle size and was admixed with 10% by weight of hexamethylenetetramine and the mixture of the resin and the abrasive was placed in a mould and was heated in the mould at a temperature of 200° C. for 1 hour under pressure of 1 ton per square inch. Thereafter, the mould was placed in an oven and was heated for a further period of 1 hour at 200° C. The abrasive articles produced were all satisfactory but the articles produced at a ratio of 1:4 were somewhat friable.

Example 7

The procedure of Example 6 was repeated except that, before the modified polymer with the hexamethylenetetramine was mixed with the abrasive grains, the latter were moistened with about 3% by weight thereof of the oily polyphosphonitrilic chloride. The articles obtained from the five mouldings were substantially identical with the corresponding products of Example 6.

Example 8

Diamond dust of a size which is passed by a 100 mesh sieve but retained by a 120 mesh sieve was admixed with the modified polyphosphonitrilic chloride described in Example 6 (containing 10% by weight of hexamethylenetetramine) in the proportions of 44.5% by weight of diamond dust to 55.5% by weight of the resin.

This mixture was placed in a mould and heated for 2 hours at a temperature of 200° C. at a pressure of 1 ton per square inch.

The stability of the moulded articles was very satisfactory.

It will be appreciated that many modifications may be made to the specific details of the foregoing examples; for example, by employing as bonding agents the various modified polyphosphonitrilic chlorides as generally described in my copending application whilst, as already indicated, any of the conventional abrasive materials may be employed as the abrasive grains instead of the carborundum grains specifically referred to.

Generally, the usual variations familiar to those skilled in the art of the manufacture of grinding wheels may be applied to the foregoing details set forth in the foregoing examples.

Although the invention is more particularly of value in connection with the manufacture of grinding wheels, due to the high temperatures occurring in use thereof, nevertheless any abrasive article is regarded as falling within the scope of the present invention.

In a further copending application Serial Number 521,407, filed July 11, 1955, there is described the production of heat-resistant materials involving interaction between various mineral substances such as naturally occurring silicates and the polyphosphonitrilic chlorides. It will be appreciated that some abrasive materials may also be capable of reaction with the polyphosphonitrilic chlorides and that therefore in the present invention the abrasive grains may react with the lower molecular weight polyphosphonitrilic chlorides during the moulding of the mixtures for the production of abrasive articles.

It will be understood that where the phenolic resins of copending application Serial Number 521,407, filed July 11, 1955, are included in the binder, the cure of those binders is effected at temperatures suitable for the phenolic resins but they may be given an "after stoving" treatment at temperatures of 300–360° C. to effect a fur- polymerisation of the polyphosphonitrilic chlorides which, however, must be conducted in such a manner as to avoid any decomposition of the phenolic resins.

What I claim is:

1. An abrasive article comprising abrasive grains bonded by a polyphosphonitrilic chloride which has been polymerised in situ to a solid infusible state.

2. An abrasive article according to claim 1 wherein said polyphosphonitrilic chloride is initially of the general formula $(PNCl_2)_n$ wherein $n$ is an integer from 3 to 7.

3. An abrasive article according to claim 1 wherein said polyphosphonitrilic chloride is modified by reaction with a polyhydroxy aromatic compound.

4. A process for the manufacture of an abrasive article which comprises heating a mixture of a polyphosphonitrilic chloride and abrasive grains in a mould at a temperature of from 175°–360° C. to effect a further polymerisation of said polymer.

5. A process according to claim 4 wherein said polyphosphonitrilic chloride is initially of the general formula $(PNCl_2)_n$ wherein $n$ is an integer from 3 to 7.

6. A process according to claim 4 wherein said polyphosphonitrilic chloride is modified by heating with a polyhydroxy aromatic compound.

7. A process according to claim 6 wherein said modified polyphosphonitrilic chloride is further polymerised by the action of heat in the presence of a curing agent for phenolic resins.

8. A process according to claim 7 wherein said curing agent is an aldehyde.

9. A process according to claim 7 wherein said curing agent is a formaldehyde donor.

10. A process according to any of claim 6 wherein said modification is effected in situ during the formation of the bond.

11. An abrasive article according to claim 3, wherein the polyhydroxy aromatic compound is selected from a group of partial esters consisting of a polyhydroxy aromatic partial ester with boric acid, a polyhydroxy aromatic partial ester with an inorganic phosphoric acid, a polyhydroxy aromatic partial ester with a polyfunctional chlorine derivative of an inorganic phosphoric acid and a polyhydroxy aromatic partial ester with phosphorous trichloride, said partial ester molecule containing free phenolic hydroxy groups.

12. An abrasive article according to claim 6 wherein the polyhydroxy aromatic compound is selected from a group of partial esters consisting of a polyhydroxy aromatic partial ester with boric acid, a polyhydroxy aromatic partial ester with an inorganic phosphoric acid, a polyhydroxy aromatic partial ester with a polyfunctional chlorine derivative of an inorganic phosphoric acid and a polyhydroxy aromatic partial ester with phosphorous trichloride, said partial ester molecule containing free phenolic hydroxy groups.

13. A process for the manufacture of an abrasive article which comprises heating at a temperature of from 175° to 360° C. in a mold a mixture of abrasive grains, a polyphosphonitrilic chloride and the product obtained by heating a polyphosphonitrilic chloride with a polyhydroxy aromatic compound, said phosphonitrilic compounds being employed as a bonding agent for the abrasive grains and said temperature effecting a further polymerization of the polymer.

References Cited in the file of this patent

UNITED STATES PATENTS

| | | |
|---|---|---|
| 2,192,921 | Lipkin | Mar. 12, 1940 |
| 2,214,769 | Lipkin | Sept. 17, 1940 |
| 2,330,286 | Honel | Sept. 28, 1943 |
| 2,357,350 | Oakes | Sept. 5, 1944 |